June 20, 1939. E. D. DALL 2,162,703
AUTOMOBILE DOOR LOCKING SYSTEM AND MECHANISM
Filed March 27, 1937 2 Sheets-Sheet 1
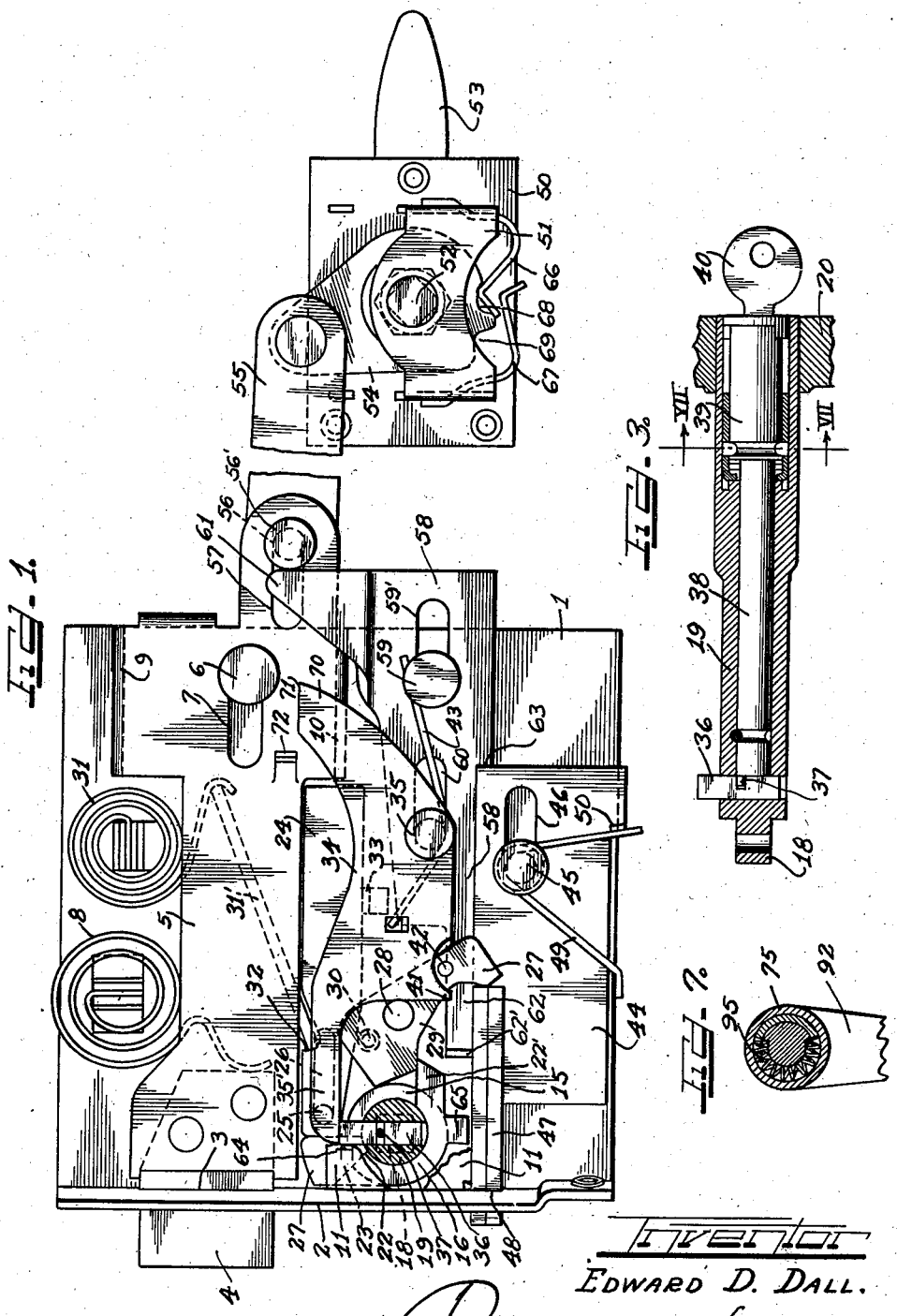
Inventor
EDWARD D. DALL.

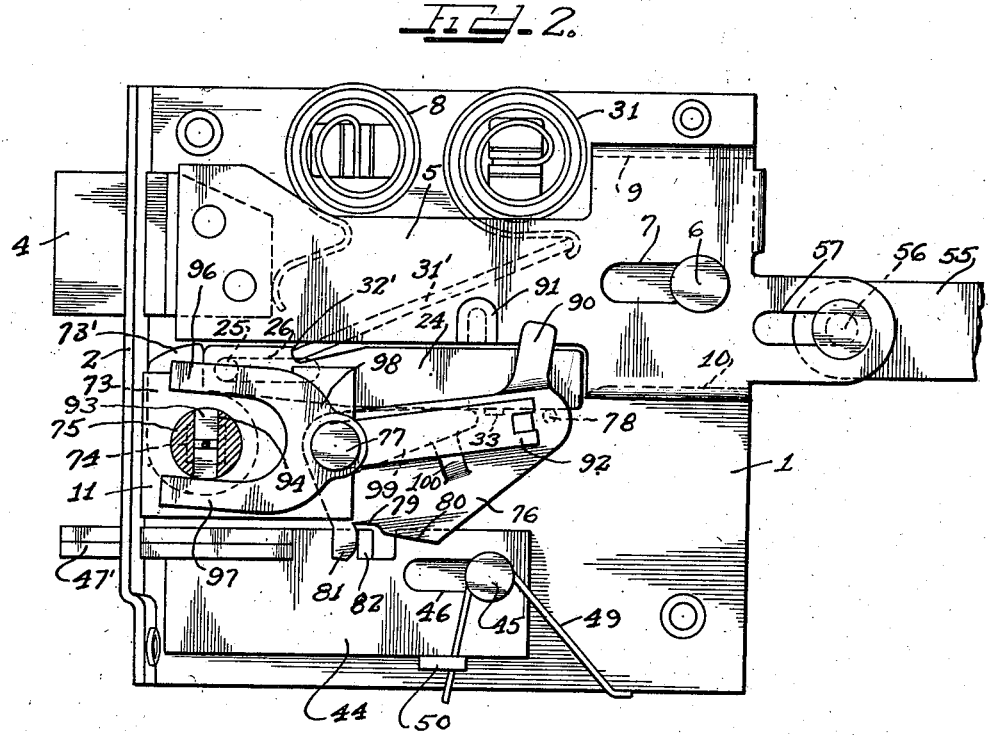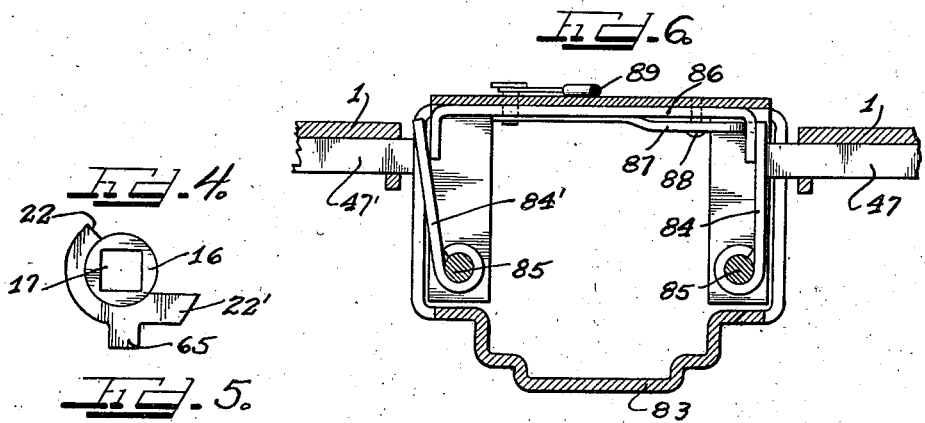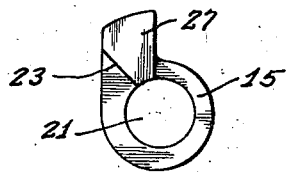

Patented June 20, 1939

2,162,703

UNITED STATES PATENT OFFICE 2,162,703

AUTOMOBILE DOOR LOCKING SYSTEM AND MECHANISM

Edward D. Dall, Waukegan, Ill., assignor to Walter F. Wright, Shaker Heights, Cleveland, Ohio Application March 27, 1937, Serial No. 133,362

3 Claims. (Cl. 70—147)

My invention relates to locking structure for controlling the locking of automotive vehicle doors and may be readily incorporated in locking controlling systems such as disclosed in my copending application Serial No. 655,180, filed February 4, 1933, now matured into Patent No. 2,102,997, dated Dec. 21, 1937, or in my copending application Serial No. 716,306, filed March 19, 1934. The invention may also be considered as an improvement over and addition to the locking controlling system and structure disclosed in my copending application Serial No. 66,149, filed February 28, 1936.

In these various locking systems referred to, locking or unlocking of all of the doors of a vehicle is controlled by manipulation of a master lock usually located on the front right door of the vehicle. The system is locked by manipulation of the outer door handle associated with the master lock and the system may be unlocked from the outside by means of a key. Locking and unlocking of the system from the inside of the vehicle is accomplished by manipulation of the inside handle mechanism associated with the master lock. In the system disclosed in my copending application Serial No. 66,149, any of the vehicle doors, after locking of the system, may be opened by manipulation of the inside handle mechanism on the doors but after a door has been opened and slammed shut the door will remain unlocked. Should the driver unlock the system by means of the inside handle mechanism at the master lock, and step out of the vehicle, he can relock the system from the outside by manipulation of the outer handle of the master lock. Many times it is more convenient for the driver to leave by the left front door while the system is locked, and in the system in the copending application referred to he does this by operating the inside handle of the left front door, but after opening of the door and slamming it shut, the door will be unlocked, while the other doors will remain locked. It may however be desirable to relock this left front door, and one important object of the invention is to provide means, preferably key-controlled, for relocking of this door.

A further object of the invention is to provide an arrangement whereby the driver may leave a locked car either by the front right door or the front left door, relock the car from the door through which he left, and then reenter the car through either of said doors.

A further object is to provide simple means for accomplishing the above referred to operation and procedure.

The various features of my invention are shown incorporated in the structure disclosed on the drawings, in which drawings:

Figure 1 is an outer side elevation of the master lock and the inside handle mechanism associated therewith;

Figure 2 is an outside elevation of a remote door lock for cooperation with and controlled by the master lock of Figure 1;

Figure 3 is a longitudinal section through a spindle lock associated with the door handle;

Figure 4 is a side elevation of the roll-back actuating cam member in the lock of Figure 1;

Figure 5 is a side elevation of the roll-back member of the lock of Figure 1;

Figure 6 is a transverse section of a stile between adjacent doors showing the transmission means for transmitting control movement of the master lock to remote locks; and Figure 7 is a section on plane VII—VII Figure 3.

A lock structure to which I have shown my invention applied is substantially that disclosed in my copending application Serial No. 66,149, filed February 20, 1936. The master lock structure shown in Figure 1 comprises a supporting plate 1 having the outer flange 2 thereon provided with the opening 3 for passage of the beveled latch bolt head 4 secured to the plate 5 slidable on the supporting plate 1 and guided by a post 6 extending from the supporting plate through the longitudinal slot 7 in the latch plate. A spring 8 engaging against the inner side of the latch bolt head tends to hold the latch bolt structure in its outer or latching position. The latch plate at its inner end is widened and has rearwardly projecting guide flanges 9 and 10 engaging the supporting plate 1.

Below the latch structure and adjacent to the flange 2, a cover plate 11 is spaced a distance from but secured to the supporting plate, the roll-back member 15 and the roll-back actuating cam member 16 being aligned in this space. The cam member has the rectangular axial passage 17 for receiving the rectangular end 18 of the spindle 19 extending from the outer door handle 20 (Fig. 3) while the roll-back member has a cylindrical passage 21 for receiving the spindle 19, the cam member having a radial shoulder 22 for cooperation with an abutment lug 23 on the roll-back member.

Slidable and swingable on the supporting wall 1 below the latch bolt structure is a retractor bar 24 having a pin 25 at its outer end extending through a guide slot 26 in the wall 1 parallel with the movement of the latch bolt structure. An arm 27 extends upwardly from the roll-back member in alignment with the outer end of the retractor bar so that when the roll-back member is rotated in clockwise direction the retractor bar will be shifted longitudinally, and when the retractor bar is in normal position its inner end will be in front of the lower flange 10 of the latch bolt plate 5 so that the bar may communicate the rotation of the roll-back member to the plate 5 for retraction of the latch bolt structure. The roll-back member is rotated in clockwise direction when the handle 20 is rotated in the same direction, as the shoulder 22 on the cam member 16 then engages with the lug 23 on the roll-back member.

Inwardly of the roll-back member and the cam member a pin 28 is journalled in the wall 1 and the cover plate 11 and carries a cam lever 29 on which is mounted a cam pin 30 for engaging with the underside of the retractor bar 24 when the lever 29 is turned in clockwise direction, such turning being effected by engagement with the lever 29 of the cam tooth 22' on the roll-back cam 16 when the cam is turned in counterclockwise direction by the handle spindle 19. Upon said turning of the cam lever, the pin 30 will cause the retractor bar to be swung upwardly a sufficient distance to carry its inner end above the latch bolt flange 10 so as to free the retractor bar from the latch bolt structure and to prevent retraction of the latch bolt structure when the retractor bar is shifted inwardly by clockwise turning of the roll-back member. A spring 31 mounted on the supporting wall 1 engages with its end against a push rod 31' which rod at its lower end abuts the shoulder 32 and tends to hold this bar down in its normal position against the stop projection 33 on the plate 1.

In front of the cam lever 29, a locking lever 34 is pivoted on a post 35 extending from the supporting plate 1, this locking lever having a projection 35' from its outer upper corner in the path of a pawl 36 transversely slidable in the spindle 19 of the handle 20, the pawl receiving the eccentric pin 37 at the end of the shaft 38 within the spindle terminating at its outer end in a lock frame 39 in which a lock cylinder (not shown) is turnable by a suitable key 40 (Fig. 3). When the key is turned, the pawl 36 will be shifted vertically either upwardly or downwardly and when shifted upwardly it will engage with the projection 35' to hold the locking lever 34 in its upper position as shown in full lines on Figure 1. The locking lever has the stop shoulder 41 for cooperating with an abutment pin or projection 42 on the lower end of the cam lever 29. Figure 1 shows the lock structure in unlocked condition, the pawl 36 being in its upper position to hold the locking lever raised. When it is desired to lock the latch bolt structure against retraction by the retractor bar 24, the key is turned to shift the pawl 36 downwardly to release the locking lever so that the spring 43 may swing the locking lever downwardly against the abutment pin 42 on the cam lever. The handle 20 is then turned a short distance in counterclockwise direction for engagement of the cam member 16 with the cam lever for clockwise rotation of the cam lever and upward swing of the retractor bar to its locking position, that is, to a position which frees it from the latch bolt structure. As the cam lever is turned, the abutment pin 42 glides past the locking lever 34 and the locking lever then is swung downwardly with its shoulder 41 behind the abutment pin to thereby lock the cam lever in said position and to hold the retractor bar in locking position. The latch bolt structure cannot be retracted from the exterior of the door as clockwise turning of the handle 20 will result only in longitudinal inward shift of the retractor bar past the abutment flange 10 without retraction of the latch bolt. To unlock the structure to permit retraction of the latch bolt by the outer handle, the key is turned to shift the pawl 36 upwardly for upward swing of the locking lever 34 and withdrawal thereof from the cam lever abutment 42, the spring 31 then returning the retractor bar to its normal or unlocking position, the downward swing of the retractor bar by its engagement with the cam pin 30 causing the cam lever 29 to be swung back to its normal position. Now upon turning of the outer handle in clockwise direction, the roll-back member 16 will shift the retractor bar inwardly against the abutment flange 10 and the latch bolt structure will be retracted.

Besides controlling the retraction of the latch bolt in the master lock (Figure 1), the cam lever 29 functions to prevent or permit operation of the latch bolt in remote locks, that is, locks on the other doors of the vehicle, as for example, the locks shown in Figure 2. Below the locking lever 34, a plate 44 is slidable on the supporting plate 1, being guided by a post 45 extending from the supporting plate 1 through the longitudinal slot 46 in the plate 44. The plate 44 at its outer end carries a pin 47 which projects through a passage 48 in the flange 2. The spring 49 which is coiled about the post 45 engages at its outer end with the supporting plate 1 and its inner end engages the abutment 50 on the plate 44, the spring tending to normally hold the plate shifted inwardly with the outer edge of the guide slot 46 abutting the post 45. When the outer handle 20 of the lock is turned in counterclockwise direction to swing the cam lever 29 for release of the retractor bar 24 from the latch bolt structure, the lever 29 at its lower end abuts against the inner end of the pin 47 and the pin and plate are shifted outwardly. As will be explained more in detail later, such outward shift of the pin 47, acting through transmission mechanism provided in the stiles or posts between adjacent doors, will cause inward movement of the pins in the remote locks for swing of the retractor bars in such remote locks away from the latch bolt structure therein so that at such remote locks the latch bolt structure cannot be retracted by turning of the outer handle.

When the locking lever 34 is in its lower position it will engage behind the cam lever abutment 42 after swing of this lever for outward shift of the pin 47, and the master lock and the remote locks will have their retractor bars held in locking position. When the key is turned at the master lock to shift the pawl 36 upwardly, the locking lever 34 is released from the cam lever and the plate 44 is shifted inwardly by the spring 49 and the master lock and the remote locks can again be opened from the exterior.

For controlling the latch bolt operation from the inside of the door on which the lock structure is applied, a supporting plate 50 is secured to the door inwardly of the latch bolt supporting structure and another plate 51 is spaced from and secured to the plate 50. These plates journal the shank 52 of an inner door handle 53 and the shank between the plate carries an arm 54 connected by link 55 with the latch bolt plate 5, the connection being by means of a pin 56 on the link engaging in the longitudinal slot 57 in the plate 5. When the handle 53 is swung in clockwise direction, the resulting pull on the link by the arm 54 will shift the latch bolt plate 5 inwardly for retraction of the latch bolt head 4. When the inner handle is in neutral position, the pin and slot connections 56—57 will permit retraction of the latch bolt structure by the outer handle 20.

When the inner handle is swung a distance in counter-clockwise direction, the lock bolt structure will be locked against retraction by the outer door handle and at the same time the pin 47 will be shifted outwardly for locking of the remote lock latch bolts against retraction by their outer handles. This is accomplished by means of a slide plate 58 guided for longitudinal inward and outward movement on the wall 1 by the post 59 of the wall 1 engaging in the slot 59' in the slide plate, and also by the pin 35 engaging in the slot 60. The slide plate at its inner end has the upward extension 61 in the path of the head 56' on the pin 56 so that when the link 55 is pushed by counterclockwise rotation of the inner handle the head 56' will abut the extension 61 and the slide plate 58 will be shifted outwardly to carry its end 62 into position below the tooth 22' on the roll-back actuating cam 16 so that the cam member will be dogged against rotation thereof and consequently rotation of the roll-back 15, and the roll-back cam will be prevented from rotation by the outer handle 20 and therefore the latch bolt cannot be retracted. Also during outward movement of the slide plate 58, a shoulder 63 thereon engages with the inner end of the pin plate 44 and this plate will be shifted outwardly for outward projection of the pin 47 and consequent locking of the latch bolt of the remote locks against retraction by their outer handles.

Ordinarily, before the inside handle mechanism on the master lock, Figure 1, is operated for locking of this lock and the remote locks, the key actuated pawl 36 will be in its upper position for holding the locking lever 34 up, and the cam lever 29 is in its normal position and the retractor bar 24 is in its unlocking position. With the pawl 36 in such upper position, rotation of the outside handle 20 in a counterclockwise direction will be prevented by the engagement of the upper end of the pawl with a stop 64 which may be formed on the cover plate 11 and therefore the system cannot be locked by turning of the handle 20. If, after locking of the system by operation of the inside handle 53, it is desired to unlock the system from the outside, the key 40 is inserted and turned to shift the pawl 36 downwardly to release the outer handle for counterclockwise rotation. Upon such counterclockwise rotation, an arm 65 on the roll-back actuating cam member 16 will engage with the forward projection 62' on the end 62 of the dogging plate 58 and this plate will be shifted inwardly to withdraw its end 62 from below the tooth 22' of the cam member so that the cam member will again be free for clockwise rotation by the outer handle.

When the pawl 36 is shifted downwardly, the locking lever 34 is released and swung downwardly against the abutment pin 42. Then when the cam member 16 is rotated for shifting back the dogging plate 58, the spring 49 tends to shift back the plate 44 and the pin 47, but at the same time the lever 29 is rotated by the cam tooth 22' and the pin 47 is held out and the retractor bar 24 is raised. However, when the handle is returned to its normal position and the cam lever 29 is released, the spring 49 and the spring 31 respectively become effective to shift the plate 44 and pin 47 back to unlocking position and to swing the retractor bar 24 back to unlocking position and the master lock and the remote locks will then be unlocked.

The inside handle mechanism is normally held in a neutral position by a spring 66 reinforced by a spring 67, the spring 66 normally engaging in the detent notch 68 on the hub of the lever 54. When the handle mechanism has been actuated in counterclockwise direction for locking the locks, the spring 66 will engage in the detent notch 69. When the roll-back cam member 16 is rotated by counterclockwise turning of the outer handle 20 on the master lock, the engagement of the cam arm 65 with the dogging plate 58 will shift the plate 58 inwardly a sufficient distance so that the plate will be shifted back fully to its normal position by the force of the spring 66 snapping back into the notch 68.

At its inner end the locking lever 34 has an upwardly extending cam tail 70 whose upper cam edge 71 is in alignment with the lower edge of a cam projection 72 on the latch bolt plate 5 outwardly of the cam edge when the master lock is in unlocked condition as shown on Figure 1. The latch bolt can now be withdrawn for opening of the door by clockwise rotation of the inside handle 53. If the system has been locked from the master door by shifting down of the pawl 36 and counterclockwise rotation of the cam member 16, and the locking lever 34 has been swung down, the cam edge 71 will be in the path of the cam extension 72. Now when the inside handle 53 is rotated in clockwise direction and the latch bolt is retracted, the engagement of the cam projection with the cam edge will swing the locking lever 34 for release of the cam lever 29 and return of the locking pin 47 and the retractor bar 24 of the master lock to unlocking position and the consequent unlocking of the latch bolts on the other or remote doors. The locking lever 34 is thus operable for unlocking of the system from the outside by shifting down the pawl 36 by operation of the key 40, or from the inside by rotation of the inner handle 53 in clockwise direction.

On Figure 2 is shown the lock structure slightly modified for service on the remote vehicle doors, that is, the doors other than the door on which the master lock is applied. The structural parts of the lock of Figure 2 which are the same as the structural parts of Figure 1 have been given the same reference numerals. In the structure of the remote lock, the roll-back cam element of Figure 1 has been omitted and only a roll-back member 73 is provided whose arm 73' is in alignment with the outer end of the retractor bar 24, the roll-back being mounted on the polygonal end 74 of the spindle 75 of the door outer handle, so that when the outer handle is turned in clockwise direction the roll-back will be directly operated for shift of the retractor bar. Locking of the latch bolt structure against retraction by the outer handle is accomplished by freeing the retractor bar from the latch bolt, such movement resulting from inward shift of the pin 47' on the plate 44, such inward shift being, as has already been explained, caused by the outward movement of the pin 47 in the master lock by way of transmission mechanism within the post or stile between adjacent doors.

In the remote locks a lever plate 76 is provided and pivoted on a pin 77 journalled in the supporting wall 1 and the cover plate 11. At its inner end this lever has the abutment extension 78 for engaging with the under edge of the retractor bar 24 so that when the lever is swung in counterclockwise direction the retractor bar will be swung upwardly to raise its inner end above the abutment flange 10 of the latch bolt structure. At its lower end the lever has a notch 79 inwardly of which the lower edge of the lever forms an incline or cam surface 80, and outwardly of the notch the lever has the abutment finger 81, the notch normally receiving the abutment extension 82 deflected from the plate 44 from which the finger 47' extends.

Figure 2 shows the parts in unlocked position, the pin 47' being held in projected position by the force of the spring 49, and in such position the abutment 82 is against the finger 81 to hold the lever 76 down for release of the retractor bar which then seats against the rest projection 33 on the plate 1, and when the outer handle is now turned in clockwise direction the retractor bar will engage with the latch bolt structure for retraction thereof. However, should the pin 47' be shifted inwardly, the abutment 82 on the plate 44 will engage with the cam edge 80 and the lever 76 will be swung upwardly for engagement of its abutment 78 with the retractor bar to swing the retractor bar to locking position, that is, free from the latch bolt structure so that when the door handle is then turned the retractor bar will merely shift longitudinally but will not retract the latch bolt. Upon release of the pin 47', the spring 49 will shift the plate 44 back to its outer position and the lever 76 will be swung downwardly for release of the retractor bar to unlocking position.

In connection with the remote door lock structures, the same inner handle mechanism can be provided as that shown in connection with the master lock on Figure 1, the handle mechanism being connected by link 55 with the latch bolt structure through the pin and slot connection 56—57.

The transmission of the movement of the master lock pin 47 to the pins 47' of the remote locks is shown on Figure 6. At the sides of the post or stile 83 between adjacent doors, levers 84 and 84' are pivoted at their outer ends by pins 85 for horizontal swing, a transmission bar 86 slidable on the rear wall of the stile being interposed between the ends of the levers. The lever 84 is in alignment with the pin 47 of the master lock structure and the lever 84' is in alignment with the pin 47' of the lock on the adjacent door so that when the pin 47 is shifted outwardly the pin 47' will be shifted inwardly for locking of the respective latch bolts against unlatching movement by the respective door outer handles.

The movement of the transmission lever 84 controlled by the master lock pin 47 may be communicated to a suitable lever 87 pivoted at 88 to the stile 83 and the movement of the lever is transmitted by a cable 89 to transmission means between the adjacent doors on the opposite side of the vehicle so that all the remote door locks may be controlled by operation of the master lock in a manner such as is disclosed in my copending applications referred to herein.

Referring again to Figure 2, the lever plate 76 has at its upper end a forwardly offset extension or arm 90 in the path of a cam hump 91 on the latch bolt plate 5 normally a distance in advance of the arm 90. The lever plate 76 is loosely mounted on the pin 77 for slight forward and rearward swing relative to the supporting plate 1. A flat spring 92 held on the pin 77 tends to hold the plate 76 with its abutment projection 78 below the retractor bar 24 so that when the lever plate is swung upwardly it will raise the retractor bar and hold it in locking position. When the latch bolt is then retracted either by operation of the inside handle or by slamming of the door, the cam hump 91 will engage the arm 90 and the lever plate will be swung forwardly to withdraw its abutment 78 from underneath the retractor bar 24 so that this bar may swing back to unlocking position. The structure thus far recited in connection with the lock on Figure 2 has the same operation as the remote lock structure on Figure 4 in my copending application Serial No. 66,149 filed February 28, 1936, the purpose of the lever extension 90 and the cam hump 91 being to prevent a remote door from being relocked after it has been opened by operation of the inside handle and then slammed shut by a person leaving through the door.

Oftentimes it is more convenient for the driver of a car to leave the car through the left front door. With the arrangement thus far described in connection with Figure 2, if, after the driver has locked the doors by operation of the inside handle of the right front door, he unlatches the left front door by operation of its inside handle and then leaves through this door and slams the door closed the door will become unlocked while the other doors will remain locked. It may be desired to lock the left front door from the outside and also to be able to re-enter the car by either the front left or the front right door whether the system has been locked from the inside or outside at the master door. To adapt the left front door for relocking after leaving therethrough and for permitting re-entry through this door, additional mechanism is provided as shown on Figure 2. Such additional mechanism comprises structure controllable by key means similar to that shown on Figure 3. In the spindle 75 of the outer handle 92 (Figure 7) is the pawl 93 shiftable in the transverse channel 94, and this pawl is normally yieldingly held with its end flush with the outer surface of the spindle by means of a spring 95 arranged in the well known manner as shown by Figure 7. The shiftable pawl 93 cooperates with the upper and lower arms 96 and 97 of a lever 98 secured to the pin 77, and this pin has also secured thereto a cam arm 99 extending inwardly below the lever plate 76 and in the plane of the retractor bar 24 so that when the cam arm is swung in counterclockwise direction by downward shift of the pawl 93, the cam arm will raise the retractor bar to its locking position with its end above the flange 10 on the latch bolt plate 5, and when the pawl 93 is shifted upwardly the lever 98 will be returned for release of the retractor bar and movement thereof back to the unlocking position shown on Figure 2.

The lever plate 76 has a portion thereof deflected rearwardly to provide a cam hump 100 in the path of the cam arm 99. During certain conditions of operation, as will be described more in detail later, the cam arm 99, during clockwise swing thereof, will engage the cam hump 100 to swing the lever plate 76 forwardly for release of its projection 78 from the retractor bar so that the retractor bar may swing to unlocking position.

Describing now the operation of the system, Figure 1 shows the master lock on the right front door in unlocking position and Figure 2 shows the lock on the left front door in unlocked condition. If the system is to be locked from the outside of the vehicle, the key of the master lock is inserted and turned to shift the pawl 36 down to release the locking lever 34 and then the outer door handle is rotated in counterclockwise direction for movement of the master lock retractor bar 24 to locking position and for outward shift of the pin 47, outward shift of the pin 47 acting through the transmission structure in the stiles, and inward shift of the pin 47' of the remote locks. Referring to Figure 2, inward shift of the pin 47' swings the lever 76 up for engagement of its abutment 78 with the retractor bar to swing the bar up to locking position. If the driver desires to enter by the right front door, he inserts and operates the key to shift the pawl 36 of the master lock upwardly thus withdrawing the locking lever 34 for release of the pin 47 and consequent release of all the pins 47' at the remote locks and swing of the retractor bars back to unlocking position. After the driver has entered the car, he may lock the entire system by rotation of the inner handle 53 in counterclockwise direction which results in dogging of the roll-back in the master lock and outward shift of the pin 47 with the consequent inward shift of the pins 47' at the remote locks for putting such locks in locked condition.

If the driver wants to leave by way of the right front door, he swings the inside handle of that door for retraction of the dogging plate 58 and undogging of the rollback for unlocking of the master lock, and the spring 49 withdraws the pin plate 44 and pin 47 for release of the pins 47' at the remote locks and consequent unlocking of these locks.

If the driver, after having locked the system from the inside of the car by manipulation of the inside handle associated with the master lock, then desires to leave by the left front door, he first operates the inside handle on the left front door to retract the latch bolt and then swings the door open. All of the doors having been locked when the driver unlatches the left front door from the inside, the retractor bar on the left front door lock, which is then in locking position, will be released by the engagement of the cam hump 91 with the arm 99 on the raised lever 76, this cam engagement swinging the lever forwardly to withdraw the abutment 78 from below the retractor bar. As the door is now swung open after unlatching, the lever 76 is released from the cam hump and swings back with its abutment 78 against the swung down retractor bar. However, when the door is swung open, the pin 47' will be released from the transmission mechanism in the adjacent stile, and the plate 44 and pin 47' are shifted outwardly for downward swing of the lever 76 whereupon this lever is swung rearwardly by the spring 92 to set its abutment 78 below the swung down retractor bar 24. Now when the door is slammed shut, and the pin 47' is again cammed in by the corresponding lever 94' in the stile, the lever 76 will be swung upwardly to raise the retractor bar 24 to locking position but, when the door is slammed shut, the latch bolt will also be shifted inwardly by engagement thereof with the stile keeper and the cam hump 91 on the latch bolt will again engage the extension 98 of the lever 76 and will swing this lever forwardly to release the retractor bar which then drops back to unlocking position, and the left front door is unlocked while all of the other doors remain locked.

When the left front door, after slamming shut, is in unlocked condition, the raised lever 76 is held with its abutment 78 against the front face of the retractor bar, by force of the spring 92. If the driver should desire to lock the left front door, he inserts and turns the key for downward shift of the pawl 93 and counterclockwise swing of the lever 98 and of the cam arm 99, the cam arm swinging the retractor bar upwardly to locking position whereupon the lever 76 swings back to again position its abutment 78 below the lower edge of the retractor bar and the lock is then in locked condition and the entire car is locked. Should the driver now desire to re-enter by the left front door he inserts and operates the key to shift the lock pawl 93 upwardly for downward swing of the arm 99, such downward swing causing the arm to engage the cam hump 100 on the lever 76 to swing this lever forwardly for withdrawal of the abutment 78 from underneath the retractor bar so that the bar may swing back to unlocking position, the door being then unlocked. Before opening the door, the driver withdraws the key from the lock so that the spring 95 (Fig. 7) may restore the pawl 93 to neutral position. The outer door handle is then turned for retraction of the latch bolt, and when the latch bolt is retracted the hump 91 has no effect on the lever 76 as this lever is already in its forwardly swung position with its abutment 78 in front of the retractor bar. When the door is now swung open and the pin 47' is released from the stile transmission mechanism, the lever 76 is swung down and then swings rearwardly for repositioning of its abutment 78 below the lower edge of the retractor bar. After the driver has then entered the car and slams the door shut, the pin 47' will be re-shifted inwardly and the lever 76 is swung up and the retractor bar is swung back to locking position. However, when the latch bolt is retracted by the slamming of the door, the hump 91 will engage the arm 98 on the lever 76 and the lever will be again swung forwardly to release the retractor bar which then drops down to unlocking position so that the left front door is then in unlocked condition. To relock the left front door from the inside of the car, the driver first manipulates the inside handle at the master lock in unlocking direction so that the pins 47' of the left front door lock and the other remote locks may shift outwardly. At the left front door lock, the lever 76 will then be swung downwardly so it may swing rearwardly for relocating of its abutment 78 below the retractor bar, and then by manipulation of the inside handle at the master lock all of the doors may be relocked.

After the left front door is unlocked and opened from the outside, and is then slammed shut from the inside, and the lever 76 was swung forwardly by the cam hump 91, the retractor bar which was swung down to unlocking position by the force of the spring 31, engages the arm 99 and swings this arm and the lever 98 back to the normal position shown on Figure 2.

If, after locking all the doors from the inside, the driver leaves by the left front door and relocks this door, and desires to re-enter by the right front door, he inserts and operates the key at the right front door to shift the pawl 36 downwardly to release the pawl from the stop 64, and he then turns the outer handle in counterclockwise direction to shift back the plate 58 and then when the handle is swung back to normal position all the locks will be unlocked and clockwise rotation of the handle will then unlatch the right front door so that the driver may enter. The system can then be relocked by manipulation of the inner handle for the master lock.

If all the doors are unlocked and the driver leaves by the right front door, he may lock the system by shifting the pawl 36 down by means of the key and then turning the outer door handle counterclockwise for operation of the cam lever 29, all the doors being then locked. To re-enter through the right front door, he inserts and operates the key to shift the pawl 36 upwardly for release of the locking lever 34 from the cam lever 29 and all of the doors will then become unlocked.

If the system has been locked from the outside at the right front door by downward shift of the pawl 36 and counterclockwise rotation of the outside handle, and the driver enters the vehicle at the left front door by means of the key for that door, he can unlock the system from the inside by operation of the inside handle for the right front door to retract the latch bolt of that door, such retraction engaging the cam projection 72 on the latch bolt with the cam edge 71 on the locking lever 34 to rotate this locking lever for release of the cam lever 29 and consequent unlocking of the locked doors.

I have shown practical and efficient embodiment of the various features of my invention but I do not desire to be limited to the exact construction, arrangement and operation shown and described as changes and modifications may be made without departing from the scope of the invention.

I claim as follows:

1. In a door, means for holding said door closed, means on the exterior of said door movable in one direction to release said holding means, means operable from the interior of said door to lock and unlock it, means operable by the exterior door means in the opposite direction for operating said interior means to unlock said door, and means for locking said exterior door means against operation in said opposite direction.

2. In a door, means for holding said door closed, means on the exterior of said door movable in one direction to release said holding means, means operable from the interior of said door to lock and unlock it, means operable by the exterior door means in the opposite direction for operating said interior means to unlock said door, and key-operated means for locking said exterior door means against operation in said opposite direction.

3. In a door, means for holding said door closed, means on the exterior of said door movable in forward direction to release said holding means, releasable means for locking said exterior door means against operation in reverse direction, means operable from the interior of said door to lock and unlock it, means operable by the exterior door means in reverse direction after release thereof for operating said interior means to unlock said door, and other means operable by such reverse movement of said exterior door means for locking said holding means against release by subsequent forward movement of said exterior means.

EDWARD D. DALL.